United States Patent
Sethi et al.

(10) Patent No.: US 12,223,335 B2
(45) Date of Patent: Feb. 11, 2025

(54) FRAMEWORK TO RECOMMEND CONFIGURATION SETTINGS FOR A COMPONENT IN A COMPLEX ENVIRONMENT

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 114 days.

(21) Appl. No.: 18/172,868

(22) Filed: Feb. 22, 2023

(65) Prior Publication Data

US 2024/0281261 A1 Aug. 22, 2024

(51) Int. Cl.
*G06F 9/445* (2018.01)
*G06F 9/4401* (2018.01)
(Continued)

(52) U.S. Cl.
CPC ...... *G06F 9/44505* (2013.01); *G06F 15/7871* (2013.01); *G06F 9/4411* (2013.01); *G06F 15/177* (2013.01); *G06F 40/20* (2020.01)

(58) Field of Classification Search
CPC .... G06F 40/20; G06F 9/44505; G06F 9/4411; G06F 15/177; G06F 15/7871
(Continued)

(56) References Cited

U.S. PATENT DOCUMENTS 6,697,962 B1  2/2004  Mccrory
7,698,131 B2  4/2010  Bennett
(Continued)

FOREIGN PATENT DOCUMENTS

CA  3052174 A1  2/2020
CA  3206778 A1 *  8/2022  ............. H04L 41/12
(Continued)

OTHER PUBLICATIONS

Walid Maalej et al., "Using contexts similarity to predict relationships between tasks", The Journal of Systems and Software, pp. 267-284, Year: 2017 (18 pages).
(Continued)

*Primary Examiner* — Ji H Bae
(74) *Attorney, Agent, or Firm* — Aly Z. Dossa; Chamberlain, Hrdlicka, White, Williams & Aughtry

(57) ABSTRACT

In general, embodiments relate to a method for adjusting a datacenter when new hardware is added. The method comprises retrieving telemetry form the datacenter and using it to detect one or more new hardware elements that have been added to the datacenter. The one or more new hardware elements are identified, and it is determined that a hardware profile template form the one or more new hardware elements does not exist in a shared storage. A component tree for the identified one or more hardware elements is created and using this component tree a hardware profile template is created for each of the identified one or more hardware elements. This profile template is saved in the shared storage and is applied to configure the datacenter to use the one or more new hardware elements.

20 Claims, 9 Drawing Sheets

(51) Int. Cl.
  *G06F 15/177* (2006.01)
  *G06F 15/78* (2006.01)
  *G06F 40/20* (2020.01)

(58) Field of Classification Search
  USPC ..................... 713/1, 2, 100; 704/9
  See application file for complete search history.

(56) References Cited

U.S. PATENT DOCUMENTS

| | | |
|---|---|---|
| 9,602,560 B1 | 3/2017 | Moody |
| 9,754,263 B1 | 9/2017 | Apple |
| 9,922,649 B1 | 3/2018 | Lore et al. |
| 10,048,996 B1 | 8/2018 | Bell et al. |
| 10,192,179 B1 | 1/2019 | Agarwal |
| 10,410,219 B1 | 9/2019 | El-nakib |
| 10,721,142 B1 | 7/2020 | Mathur et al. |
| 11,436,642 B1 | 9/2022 | Podgorny et al. |
| 2001/0047270 A1 | 11/2001 | Gusick et al. |
| 2003/0041088 A1* | 2/2003 | Wilson .............. G06F 9/4411 713/1 |
| 2006/0010110 A1 | 1/2006 | Kim et al. |
| 2006/0080107 A1 | 4/2006 | Hill et al. |
| 2008/0091829 A1 | 4/2008 | Spataro |
| 2008/0152122 A1 | 6/2008 | Idan et al. |
| 2009/0083246 A1 | 3/2009 | Coker et al. |
| 2010/0050074 A1 | 2/2010 | Nachmani et al. |
| 2011/0055122 A1 | 3/2011 | Andreoli |
| 2011/0071869 A1 | 3/2011 | Obrien et al. |
| 2011/0320228 A1 | 12/2011 | Kowalski |
| 2014/0281739 A1 | 9/2014 | Tuffs |
| 2014/0337377 A1 | 11/2014 | De Assuncao et al. |
| 2014/0344565 A1* | 11/2014 | Wu .............. G06F 9/44505 713/100 |
| 2015/0278534 A1 | 10/2015 | Thiyagarajan |
| 2015/0310445 A1 | 10/2015 | Chan et al. |
| 2016/0027019 A1 | 1/2016 | Michaelangelo et al. |
| 2016/0055044 A1 | 2/2016 | Kawai et al. |
| 2016/0132812 A1 | 5/2016 | Beasley et al. |
| 2016/0171505 A1 | 6/2016 | Johri et al. |
| 2016/0371756 A1 | 12/2016 | Yokel |
| 2017/0109222 A1 | 4/2017 | Singh et al. |
| 2017/0132060 A1 | 5/2017 | Nomura et al. |
| 2018/0007204 A1 | 1/2018 | Klein |
| 2018/0012231 A1 | 1/2018 | Sapoznik et al. |
| 2018/0129785 A1 | 5/2018 | Pal |
| 2018/0191903 A1 | 7/2018 | Yokel |
| 2018/0278687 A1 | 9/2018 | Handa |
| 2018/0285320 A1 | 10/2018 | Yang et al. |
| 2018/0349394 A1 | 12/2018 | Hu |
| 2019/0163594 A1 | 5/2019 | Hayden et al. |
| 2019/0196682 A1 | 6/2019 | Madafferi |
| 2019/0228107 A1 | 7/2019 | Trim et al. |
| 2019/0228296 A1 | 7/2019 | Gefen et al. |
| 2019/0236132 A1 | 8/2019 | Zhu et al. |
| 2019/0340249 A1 | 11/2019 | Connell, II |
| 2019/0349321 A1 | 11/2019 | Cai et al. |
| 2019/0355042 A1 | 11/2019 | Swierk et al. |
| 2020/0027094 A1 | 1/2020 | Consalvo et al. |
| 2020/0117531 A1 | 4/2020 | Sudharsana |
| 2020/0184355 A1 | 6/2020 | Mehta |
| 2020/0218492 A1 | 7/2020 | Farivar |
| 2020/0302018 A1 | 9/2020 | Turkkan et al. |
| 2020/0311738 A1 | 10/2020 | Gupta et al. |
| 2020/0364638 A1 | 11/2020 | Molloy et al. |
| 2021/0109832 A1 | 4/2021 | Ladkani |
| 2021/0136195 A1 | 5/2021 | Adibi et al. |
| 2021/0209635 A1 | 7/2021 | Czajka et al. |
| 2021/0264438 A1 | 8/2021 | Singh |
| 2021/0319189 A1 | 10/2021 | Trehan |
| 2021/0357598 A1 | 11/2021 | Li |
| 2022/0019935 A1 | 1/2022 | Ghatage et al. |
| 2022/0050733 A1 | 2/2022 | Selvaraju |
| 2022/0066791 A1* | 3/2022 | Drury .............. G06F 9/546 |
| 2022/0067746 A1 | 3/2022 | Thakkar |
| 2022/0094789 A1 | 3/2022 | Lau et al. |
| 2022/0129257 A1 | 4/2022 | Touati et al. |
| 2022/0197725 A1 | 6/2022 | Liu |
| 2022/0215273 A1 | 7/2022 | Sethi et al. |
| 2022/0308943 A1 | 9/2022 | Srinivasan et al. |
| 2023/0120510 A1 | 4/2023 | Sesha |
| 2023/0132116 A1 | 4/2023 | Sethi et al. |
| 2024/0187836 A1 | 6/2024 | Ball |

FOREIGN PATENT DOCUMENTS

| | | |
|---|---|---|
| CN | 105493446 A | 4/2016 |
| EP | 1873699 A1 | 1/2008 |
| WO | 2009087489 A1 | 7/2009 |
| WO | 2014043623 A1 | 3/2014 |

OTHER PUBLICATIONS

Dhoolia et al., "A cognitive system for business and technical support: A case study", IEEE Xplore, vol. 61, No. 1, Paper 7, pp. 74-85, Year: 2017 (12 pages).

Law et al., "An Integrated Case-Based Reasoning Approach for Intelligent Help Desk Fault Management", Expert Systems With Applications, vol. 13, No. 4, pp. 265-274, Year: 1997 (10 pages).

Mark Granger, "ServiceNow products and services explained", https://web/archive.org/web/20210420101531/https://www.nelsonfrank.com/insights/servicenow-products-services-explained <accessed date Aug. 12, 2022>, 10 pages.

Ranchal R et al., Protection of identity information in cloud computing without trusted third party, In 2010 29th IEEE symposium on reliable distributed systems, 5 pages, 2010.

Robbes Romain et al, Using contexts similarity to predict relationships, The Journal of Systems and Software, 18 pages, 2017.

* cited by examiner

FRAMEWORK TO RECOMMEND CONFIGURATION SETTINGS FOR A COMPONENT IN A COMPLEX ENVIRONMENT

BACKGROUND

In an enterprise environment, a system might be running multiple applications that are either working together or dependent on each other. The system may take the form of a datacenter and comprise of many hardware elements/devices such as processors, storage devices, network devices, and other devices/elements. When a new hardware element is added to the datacenter, the datacenter must be correctly configured to use the hardware element or unexpected downtime, decreased performance, and/or complete failure of applications may occur.

SUMMARY

In general, embodiments described herein relate to a method for adjusting a datacenter when new hardware is added. The method initially retrieves telemetry from the datacenter and determines from the telemetry that one or more new hardware elements have been added to the datacenter. The method then identifies the one or more new hardware elements and determines that a hardware profile template does not already exist in a shared storage. Once the method determines that a hardware profile template of the identified one or more new hardware elements does not exist, the method creates a component tree for each of the one or more new hardware elements. From this component tree a hardware profile template may be created which is then saved to the shared storage. The method concludes by initiating application of the hardware profile template for each of the identified one or more new hardware elements to configure the datacenter to use the one or more new hardware elements.

In general, embodiments described herein relate to a non-transitory computer readable medium comprising computer readable program code. The computer readable code, which when executed by a computer processor, enables the computer processor to perform a method for adjusting a datacenter when new hardware is added. The method initially retrieves telemetry from the datacenter and determines from the telemetry that one or more new hardware elements have been added to the datacenter. The method then identifies the one or more new hardware elements and determines that a hardware profile template does not already exist in a shared storage. Once the method determines that a hardware profile template of the identified one or more new hardware elements does not exist, the method creates a component tree for each of the one or more new hardware elements. From this component tree a hardware profile template may be created which is then saved to the shared storage. The method concludes by initiating application of the hardware profile template for each of the identified one or more new hardware elements to configure the datacenter to use the one or more new hardware elements.

In general, embodiments described herein relate to a datacenter which comprises at least one processor and at least one memory. The memory includes instructions, which when executed by the processor perform a method for adjusting a datacenter when new hardware is added. The method initially retrieves telemetry from the datacenter and determines from the telemetry that one or more new hardware elements have been added to the datacenter. The method then identifies the one or more new hardware elements and determines that a hardware profile template does not already exist in a shared storage. Once the method determines that a hardware profile template of the identified one or more new hardware elements does not exist, the method creates a component tree for each of the one or more new hardware elements. From this component tree a hardware profile template may be created which is then saved to the shared storage. The method concludes by initiating application of the hardware profile template for each of the identified one or more new hardware elements to configure the datacenter to use the one or more new hardware elements.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
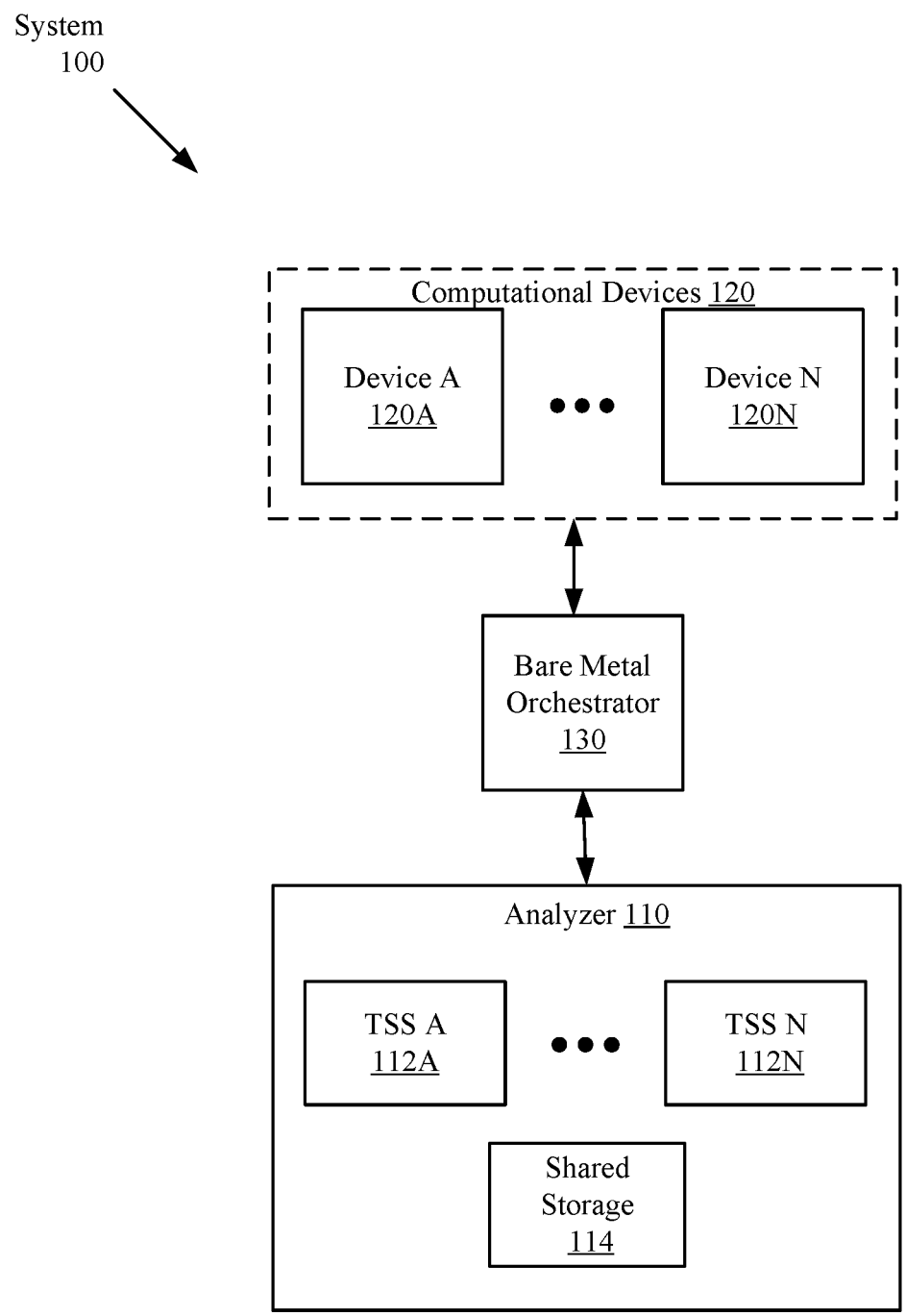
FIG. 1A shows a diagram of a system in accordance with one or more embodiments of the invention.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regards to a figure, in various embodiments described herein, may be equivalent to one or more like-named components described with regard to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for configuring a datacenter when a new hardware element is added to the datacenter. The datacenter may be running multiple applications on multiple individual computing devices. Each of these devices need to be correctly configured both locally and in the larger computing system in order to allow the applications to function correctly and efficiently.

Previously when a new hardware element was added to a datacenter a user/administrator would have to manually configured the system. However, the user/administrator is often unaware of the ideal configuration for the system, and when a system becomes increasingly complicated such as a large datacenter, even if the user/administrator understand the ideal configuration for the hardware, they may not be aware of all the other applications and/or devices that need reconfigured.

Further in modern complex computing systems such as datacenters, cloud, edge, and other computing environments, multiple systems, and applications, which are potentially geographically dispersed depend on each other. Making changes without understanding these complex interactions may result in the new hardware not being efficiently used and/or even failing. Even if the user or administrator is successful in configuring the new hardware for the local system, this might not be the correct configuration given the larger networked system.

In order to avoid such problems, one or more embodiments of the invention proposes introducing an additional device or service: "bare metal orchestrator." The bare metal orchestrator along with a system analyzer determines dependencies and based on these dependencies and the system configuration determines an ideal configuration for the new hardware element as well as any other affected components of the computing system. This results in making installing a new hardware element more efficient, increasing productivity and system performance.

FIG. 1A shows a diagram of a system (100) that performs the claimed methods in one or more embodiments of the invention. The system includes a plurality of computational devices (120) which are connected to a bare metal orchestrator (130) and an analyzer (110). The computational devices (120) are connected to each other and the other components of the system through a network (not shown).

The computational devices (e.g., 120) may comprise of a plurality of devices (e.g., 120A-120N) such as, but not limited to, datacenters, personal computers (PCs), laptops, and any other computation device that can have its hardware upgraded and/or replaced. For simplicity, the system shown in FIG. 1A only shows two devices (120A, 120N), however, they are only representative, and a subset of the system and the system may include any number of datacenters that are geographically dispersed (for example, in a non-limiting example one or more located on each continent). Further, in one or more embodiments of the invention, one or more computational devices (e.g., 120A-120N) may be located at the same facility and/or one or more datacenters located remotely in other locations that are geographically dispersed. The computation devices (e.g., 120) will be described in more detail with regards to FIG. 1B.

Figure 6:
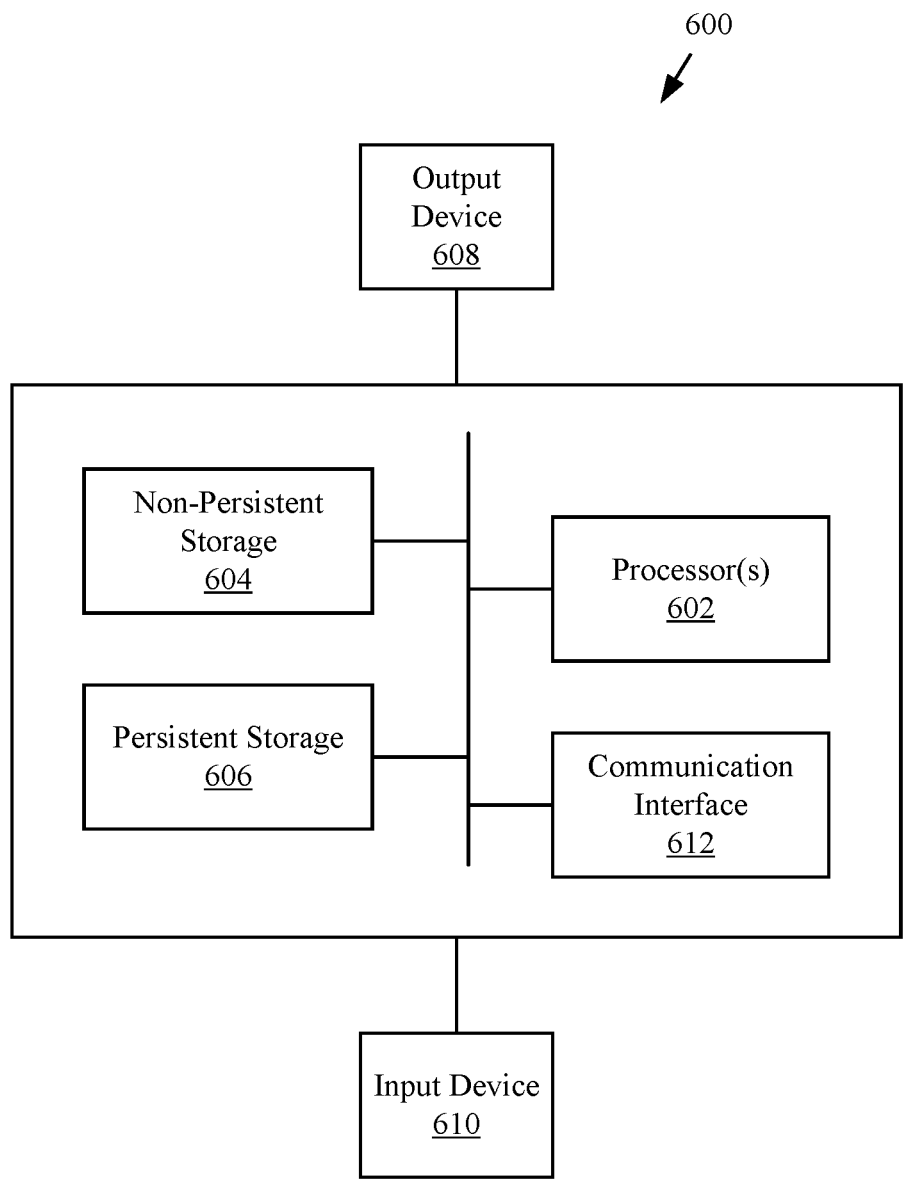
FIG. 6 shows a computing system in accordance with one or more embodiments of the invention.

In one or more embodiments of the invention, each of the computational devices (e.g., 120A-120N) is implemented as a computing device (see e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each computational device (e.g., 120A-102N) described throughout this application.

In one or more embodiments of the invention, each computational device (e.g., 120A-120N) is implemented as a logical device. The logical device may utilize the computing resources of any number of computing devices, and thereby provide the functionality of the computational device (e.g., 120A-120N) described throughout this application.

The system (100) includes an analyzer (110). The analyzer (110) includes a plurality of technical support systems (TSSs) (e.g., 112A-112N). The analyzer (110) also includes shared storage (114). In one or more embodiments of the invention, the analyzer (110) monitors one or more of the computational devices (120) to determine that a new hardware element has been added. This may be done by monitoring the telemetry and/or logs of the one or more computation devices (120). In one or more other embodiments of the invention, one or more computational devices (120) may signal the analyzer that a new hardware element has been added.

The analyzer (110) analyzes the telemetry and/or other information from the computation devices (120) to produce a component tree and hardware profile template as will be discussed in more detail with regards to the methods shown in FIGS. 4 and 5 below. In one or more embodiments the component tree takes the from shown in FIG. 3, which will be described in more detail below. The analyzer may also save one or more hardware profile templates in the shared storage (114) for use when future hardware elements are added, so that the hardware profile templates may be reused for identical hardware elements (for example: in a non-limiting example, when replacing a hard-drive with an identical hard-drive, the previous profile template may be sufficient).

As discussed above, the analyzer (110) includes a plurality of TSS (e.g., 112A-112N). Each of the TSSs (e.g., 112A-112N) may be operably connected to each other via any combination of wired/wireless connections. In one or more embodiments of the invention, the computational devices (120) correspond to devices (which may be physical or logical, as discussed below) that are have new hardware added to and/or are experiencing failures and that are directly or indirectly connected to the TSSs (e.g., 112A-112N), such that the computational devices (120) provide telemetry and/or logs to the TSS(s) for analysis (as further discussed below).

In one or more embodiments of the invention, each of the TSSs (e.g., 112A-112N) is a system to interact with the customers (via the computational devices (120)) in order to resolve technical support issues. The TSSs (112A-112N), in one or more embodiments of the invention, are also used for determining device profiles when one or more new hardware elements are added to the system as described in more detail with respect to the methods shown in FIGS. 4 and 5.

In one or more embodiments of the invention, the TSSs (e.g., 112A-112N) are implemented as a computing device (see e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the TSSs (e.g., 112A-112N) described throughout this application.

In one or more embodiments of the invention, the TSSs (e.g., 112A-112N) are implemented as a logical device. The logical device may utilize the computing resources of any number of computing devices and thereby provide the functionality of the TSSs (e.g., 112A-112N) described throughout this application. Additional details about the TSSs (e.g., 112A-112N) are provided in FIGS. 2A and 2B below.

In one or more embodiments of the invention, the analyzer also includes shared storage (114). The shared storage (114) corresponds to any type of volatile or non-volatile (i.e., persistent) storage device that includes functionality to store unstructured data, structured data, etc. The shared storage (114) may provide storage for the TSS (e.g., 112A-112N) as well as store the component tree and hardware profile templates as will be discussed in more detail with regards to the methods of FIGS. 4 and 5. The shared storage may also store such things as knowledge base (KB) articles as well as other information that may be used in performing the methods shown in FIGS. 4 and 5. The shared storage (114) in one or more embodiments of the invention may be separate from the analyzer and/or part of either the computational devices (120) and/or the bare metal orchestrator (130).

The bare metal orchestrator (130) is an infrastructure monitoring solution that configures and monitors the computational devices (e.g., 120). The bare metal orchestrator (130) utilizes the hardware profile template stored in the shared storage (114) and utilizes it to apply settings to the hardware element as well as the affected components and applications of the computational devices (e.g., 120). In one or more embodiments of the invention, the bare metal orchestrator (130) may be located remotely such as, but not limited to, a manufacturers datacenter, a cloud environment, or other location different than the computational devices (e.g., 120). In one or more other embodiments of the invention, it may be located in the same datacenter and/or location as one or more of the computational devices (e.g., 120).

In one or more embodiments of the invention, the bare metal orchestrator (e.g., 130) is implemented as a computing device (see e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the bare metal orchestrator (e.g., 130) described throughout this application.

In one or more embodiments of the invention, the bare metal orchestrator (e.g., 130) is implemented as a logical device. The logical device may utilize the computing resources of any number of computing devices and thereby provide the functionality of the bare metal orchestrator (e.g., 130) described throughout this application.

Figure 1B:
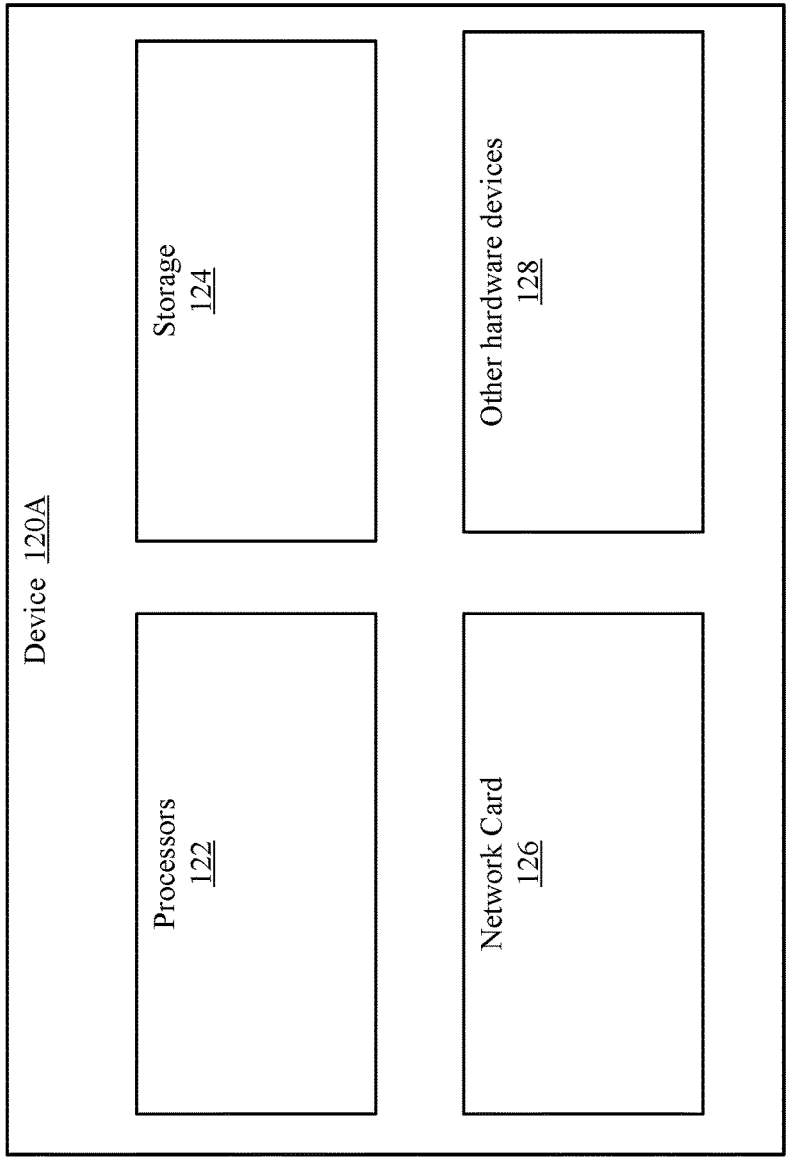
FIG. 1B shows a detailed diagram of a computational device in accordance with one or more embodiments of the invention.

FIG. 1B shows a diagram of a computational device (120A) that in one or more embodiments of the invention includes one or more hardware elements, including a new hardware elements. The computational device (120A) is similar to the computational devices (e.g., 110A-110N) described above with regards to FIG. 1A. The computational devices (e.g., 120A) hosts one or more applications and other processes. The computational devices (e.g., 120A) includes one or more processors (122), storage (124), at least one network card (126), and other hardware elements (128).

In one or more embodiments of the invention, the computational device (120A) may host production hosts and/or virtual machines (VMs) that host one or more applications, web services, and/or databases. Each of the computational devices (e.g., 120A) may host any number of production hosts and/or VMs that, in turn, host any number of applications.

In one or more embodiments of the invention, the computational device (120A) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the computational device (e.g., 120A) described throughout this application.

The computational device (120A) in one or more embodiments of the invention includes one or more processors (122). The processor(s) (e.g., 122) may be a physical device, or it may be implemented as a logical device. The logical device may utilize the computing resources of any number of computing devices and thereby provide the functionality of the processor(s) (e.g., 122) described throughout this application.

The processor(s) (e.g., 122) host one or more applications that may comprise of web services, databases, operating systems (OS), games, virtual machines, and/or any other applications that one or more users or processes depend on. The processor(s) (e.g., 122) may host or be operatively connected to at least one storage device (e.g., 124).

In one or more embodiments the device (120A) includes storage (124) that may be physical storage or logical/virtual storage e.g., (not shown) that is connected to the processor (122). The storage device (124) may be one or more physical storage devices such as a hard disk drive, solid disk drive, tape drives, and or other physical storage mediums of any number of computing devices. Additionally, the device (120A) may utilize remote storage or resources such as those located externally on a cloud environment, other device (e.g., 120A-120N, FIG. 1A), or other location. The logical storage devices may utilize any quantity of hardware storage resources of any number of computing devices for storing data. For example, the storage may utilize portions of any combination of hard disk drives, solid state disk drives, tape drives, and/or any other physical storage medium of any number of computing devices. Alternatively, or in addition, in one or more embodiments of the invention, the virtual storage devices may instead be physical storage devices of any number of computing devices.

The computational devices may additionally be connected through one or more networks (not shown) including the Internet. In order to communicate with the networks, the computational device (120A), in one or more embodiments of the invention, may include a network card (NIC) (126). The NIC (126) allows the processor (122), storage (124), and other hardware elements (128) to communicate with other computational devices (e.g., 120A-120N, FIG. 1A) such as clients (not shown), users (not shown) and other computer systems such as one or more edge environments (not shown) and/or cloud-based storage environments (not shown). Both the computational device (120A) and/or the system (e.g., 100, FIG. 1A) and optional connected edge and cloud-based systems may be public or private (such as an internal or corporate cloud run by the owner of the system (100) shown in FIG. 1A).

A network may refer to an entire network or any portion thereof (e.g., a logical portion of the devices within a topology of devices). A network may include a datacenter network, a wide area network (WAN), a local area network (LAN), a wireless network, a cellular phone network, and/or any other suitable network that facilitates the exchange of information from one part of the network to another. A network may be located at a single physical location or be distributed at any number of physical sites. In one or more embodiments, the network may be coupled with or overlap, at least in part, with the Internet.

In one or more embodiments, the network may include any number of devices within any of the components of the system. In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

The one or more computational devices (e.g., 120A) may communicate over one or more networks using encryption. In one or more embodiments of the invention the individual nodes and/or datacenters may communicate with each other using 128-bit encryption. The individual nodes and/or datacenters may also communicate with clients and users using strong encryption such as 128-bit encryption. Other forms of encryption such as, but not limited to, symmetric-key schemes, public-key schemes, RSA, etc. may be used for communicating between the datacenters, nodes, and other components and entities without departing from the invention.

The computational device (120A) may include additional hardware elements (e.g., 128). These devices may be, but are not limited to, as graphics cards, specialty processors, security modules, and any other hardware that a particular application of the computational device (120A) needs. Other devices and modules may be included in the computational device (120A) without departing from the invention.

Figure 4:
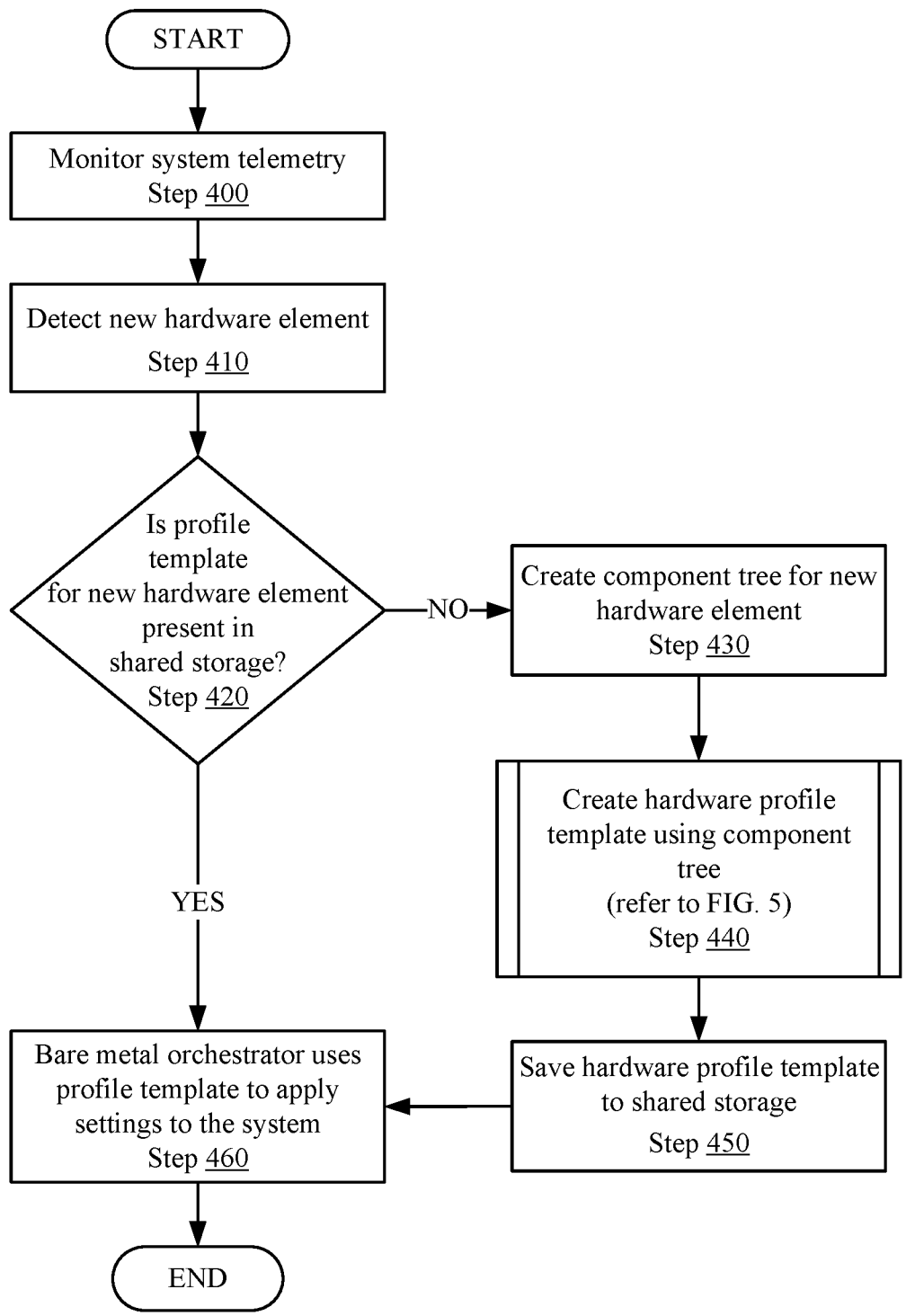
FIG. 4 shows a flowchart of a method for detecting and configuring a new hardware element in accordance with one or more embodiments of the invention.
Figure 5:
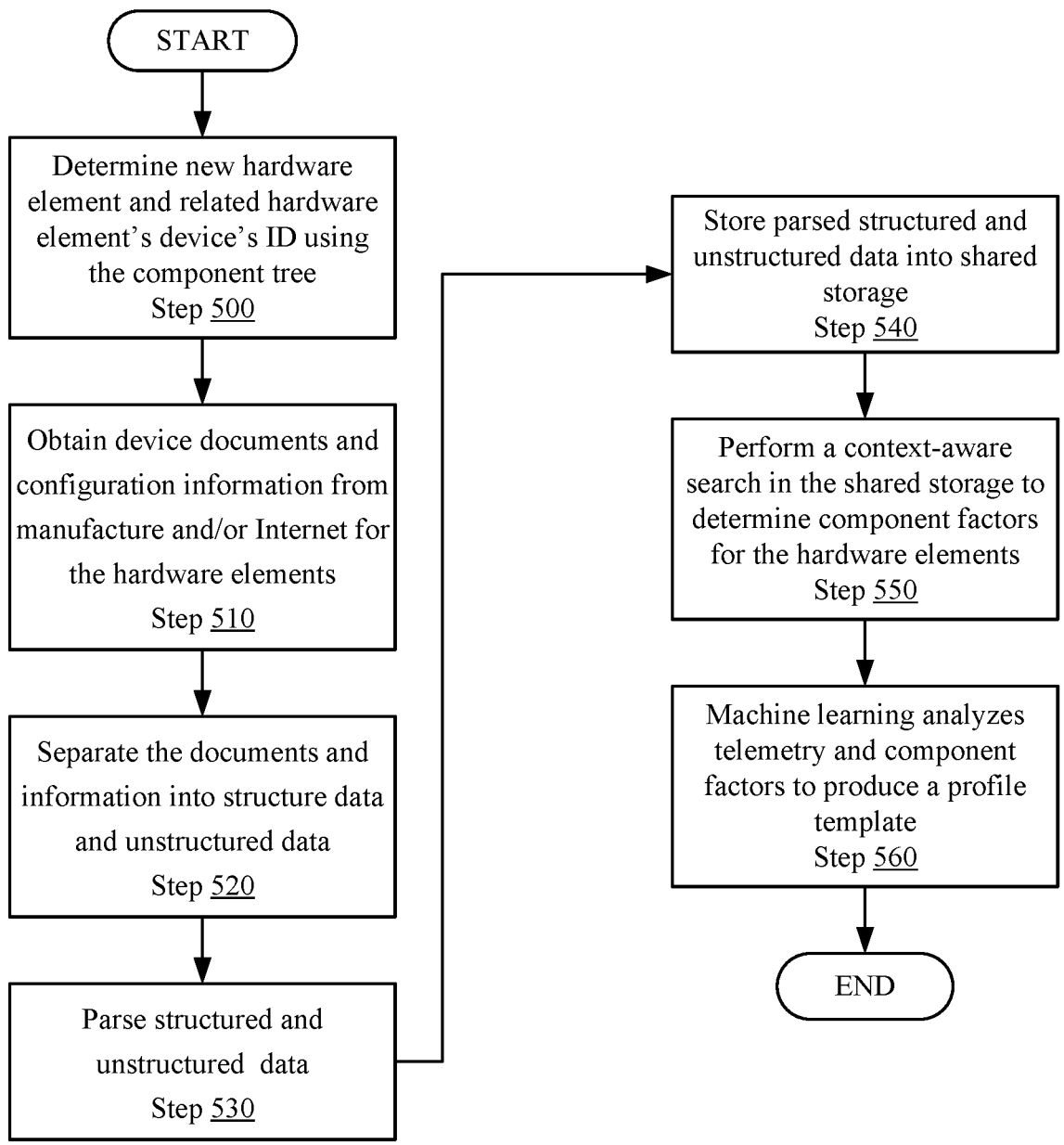
FIG. 5 shows a flowchart of a method for creating a hardware profile template for configuring a new hardware element in accordance with one or more embodiments of the invention.

When a new hardware element or device, such as additional storage (e.g., 124) or other hardware devices (e.g., 128) is added in accordance with the methods shown in FIGS. 4 and 5, all the components in the computational device (e.g., 120A) may need to be adjusted. This may be a simple change in a registry or driver, or it may involve changing one or more settings in the operating system (OS) and/or one or more applications hosted by the device (120A).

While FIGS. 1A and 1B show a configuration of components, other configurations may be used without departing from the scope of embodiments described herein. For example, although FIG. 1A shows all components as part of two devices, any of the components may be grouped in sets of one or more components which may exist and execute as part of any number of separate and operatively connected devices. Accordingly, embodiments disclosed herein should not be limited to the configuration of components shown in FIGS. 1A and 1B.

Figure 2A:
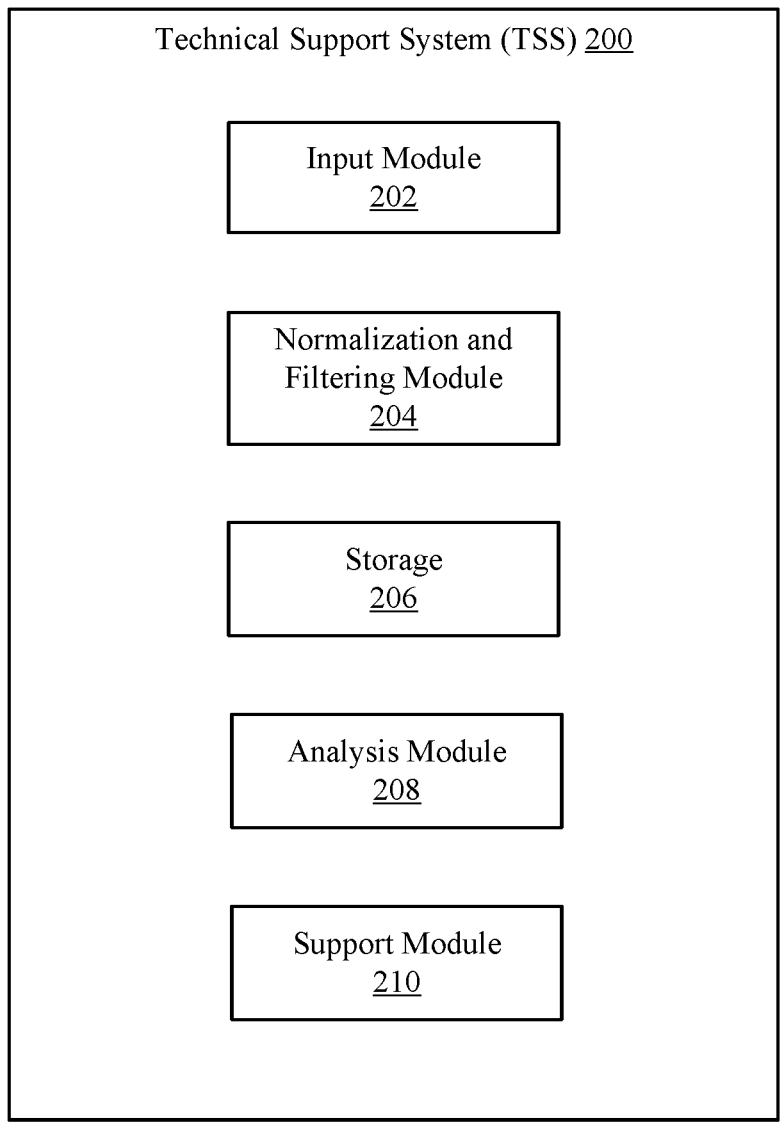
FIG. 2A shows a diagram of a technical support system (TSS) in accordance with one or more embodiments of the invention.

Turning now to FIG. 2A, FIG. 2A shows a diagram of a technical support system (TSS) in accordance with one or more embodiments of the invention. The TSS of FIG. 2A may be similar to that described in FIG. 1A (e.g., 112A-112N). The TSS (200) includes an input module (202), a normalization and filtering module (204), storage (206), an analysis module (208), and a support module (210). Each of these components is described below.

In one or more embodiments of the invention, the input module (202) is any hardware, software, or any combination thereof that includes functionality to obtain system logs (e.g., transition of device states, an alert for medium level of central processing unit (CPU) overheating, new hardware detection, etc.) and important keywords for the computing device (e.g., new hardware identification and configuration)

related to the new hardware component. The input module (202) may include functionality to transmit the obtained system logs and important keywords to the normalization and filtering module (204) as an input.

In one or more embodiments of the invention, the normalization and filtering module (204) processes the input received from the input module (202) and extracts the relevant data. Additional details for the normalization and filtering module (204) are provided in FIG. 2B.

In one or more embodiments of the invention, the storage (206) corresponds to any type of volatile or non-volatile (i.e., persistent) storage device that includes functionality to store extracted relevant data by the normalization and filtering module (204). In various embodiments of the invention, the storage (206) may also store a device state path.

In one or more embodiments of the invention, the analysis module (208) is configured to predict a next device state of a device based on a current device state of the device. The analysis module (208) may also be able to determine relationships between components and applications in order to produce a component tree as will be described in more detail below with regards to FIG. 3A. The analysis module (208) may be implemented using hardware, software, or any combination thereof. Additional detail about the analysis module (208) is provided below.

In one or more embodiments of the invention, the support module (210) is configured to obtain solutions or workaround documents for previous and new hardware components. The support module (210) may include functionality to analyze the obtained documents and to store them into the shared storage (e.g., 114, FIG. 1A). Based on a context-aware search performed in the shared storage (e.g., 114, FIG. 1A), the support module provides the most relevant hardware profile templates for configuring the new hardware and related components. The support module (210) may be implemented using hardware, software, or any combination thereof.

Figure 2B:
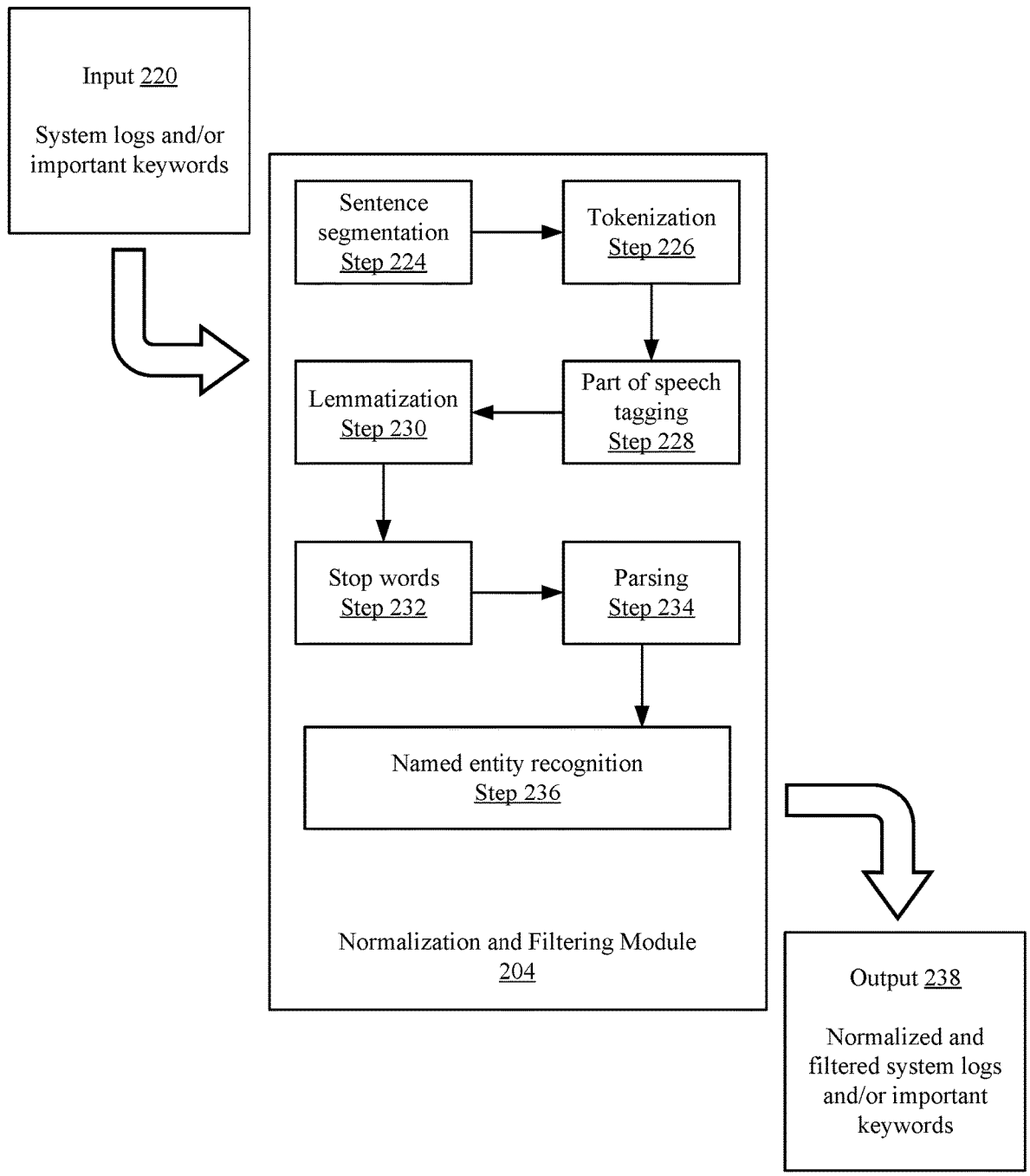
FIG. 2B shows a diagram of a normalization and filtering module and a flowchart about the operation of the normalization and filtering module in accordance with one or more embodiments of the invention.

Turning now to FIG. 2B, FIG. 2B shows a diagram of a normalization and filtering module and a flowchart about the operation of the normalization and filtering module in accordance with one or more embodiments of the invention. The normalization and filter module in one or more embodiments of the invention may be used for separating and parsing information such as KB articles as will be described in more detail below with respect to the method of FIG. 5.

For the sake of brevity, not all components of the normalization and filtering module may be illustrated in FIG. 2B. In one or more embodiments of the invention, the normalization and filtering module (204) may obtain the system logs and important keywords for the computing device from the input module (e.g., 202, FIG. 2A) as an input (220). The operation of the normalization and filtering module (204) is explained below.

In step 224, the input (e.g., Washington, D.C., is the capital of the United States of America. It is also home to iconic museums.) is broken into separate sentences (e.g., Washington, D.C., is the capital of the United States of America).

In step 226, tokenization (e.g., splitting a sentence into smaller portions, such as individual words and/or terms) of important elements of a targeted sentence and the extraction of a token (i.e., keyword) based on the identified group of words occurs. For example, based on step 224, the input is breaking into the smaller portions as "Washington", "D", ".", "C", ".", ",", "is", "the", "capital", "of", "the", "United", "States", "of", "America", ".".

In step 228, a part of speech (e.g., noun, adjective, verb, etc.) of each token will be determined. In one or more embodiments of the invention, understanding the part of speech of each token will be helpful to figure out the details of the sentence. In one or more embodiments of the invention, in order to perform the part of speech tagging, for example, a pre-trained part of the speech classification model may be implemented. The pre-trained part of speech classification model attempts to determine the part of speech of each token based on similar words identified before. For example, the pre-trained part of speech classification model may consider "Washington" as a noun and "is" as a verb.

In step 230, following the part of speech tagging step, a lemmatization (i.e., identifying the most basic form of each word in a sentence) of each token is performed. In one or more embodiments of the invention, each token may appear in different forms (e.g., capital, capitals, etc.). With the help of lemmatization, the pre-trained part of speech classification model will understand that "capital" and "capitals" are originated from the same word. In one or more embodiments of the invention, lemmatization may be implemented according to a look-up table of lemma forms of words based on their part of speech.

Those skilled in the art will appreciate that while the example discussed in step 230 considers "capital" and "capitals" to implement the lemmatization, any other word may be used to implement the lemmatization without departing from the invention.

In step 232, some of the words in the input (e.g., Washington, D.C., is the capital of the United States of America.) will be flagged and filtered before performing a statistical analysis. In one or more embodiments of the invention, some words (e.g., a, the, and, etc.) may appear more frequently than other words in the input and while performing the statistical analysis, they may create a noise. In one or more embodiments of the invention, these words will be tagged as stop words and they may be identified based on a list of known stop words.

Those skilled in the art will appreciate that while the example discussed in step 232 uses "a", "the", "and" as the stop words, any other stop word may be considered to perform flag and filter operation in the statistical analysis without departing from the invention.

Continuing the discussion of FIG. 2B, in step 234, a process of determining the syntactic structure of a sentence (i.e., a parsing process) is performed. In one or more embodiments of the invention, the parsing process may determine how all the words in a sentence relate to each other by creating a parse tree. The parse tree assigns a single parent word to each word in the sentence, in which the root of the parse tree will be the main verb in the sentence. In addition to assigning the single parent word to each word, the parsing process may also determine the type of relationship between those two words. For example, in the following sentence, "Washington, D.C., is the capital of the United States of America," the parse tree shows "Washington" as the noun and it has a "be" relationship with "capital".

In step 236, following the parsing process, a named entity recognition process is performed. In one or more embodiments of the invention, some of the nouns in the input (e.g., Washington, D.C., is the capital of the United States of America.) may present real things. For example, "Washington" and "America" represent physical places. In this manner, a list of real things included in the input may be detected and extracted. In one or more embodiments of the invention, to do that, the named entity recognition process applies a statistical analysis such that it can distinguish "George Washington", the person, and "Washington", the place, using context clues.

Those skilled in the art will appreciate that while the example discussed in step 236 uses physical location as a context clue for the named entity recognition process, any other context clues (e.g., names of events, product names, dates and times, etc.) may be considered to perform the named entity recognition process without departing from the invention.

Following step 236, the processed input (220) is extracted as normalized and filtered system logs of the device and/or the important keywords for the computing device as an output (238). In one or more embodiments of the invention, the output (238) may be stored in the storage (e.g., 206, FIG. 2A).

Figure 2C:
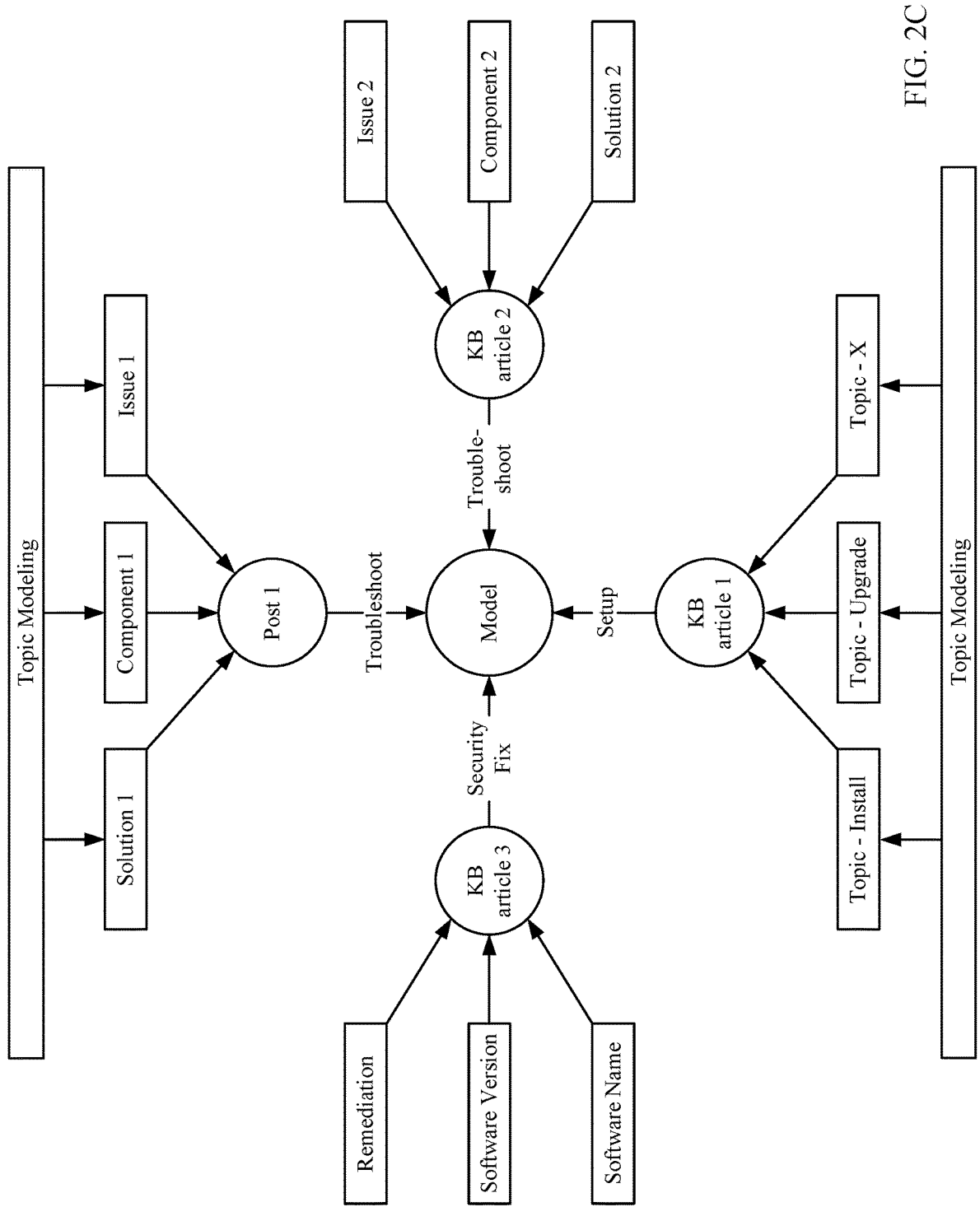
FIG. 2C shows a diagram of a shared storage in accordance with one or more embodiments of the invention.

Turning now to FIG. 2C, FIG. 2C shows a diagram of a shared storage in accordance with one or more embodiments of the invention. In one or more embodiments of the invention, the shared storage may include one or more KB articles (e.g., KB article 1, KB article 2, KB article 3, etc.), one or more posts (e.g., post 1) posted by the customers. In one or more embodiments of the invention, the KB articles (e.g., "How to configure a new network card?" "What fan speeds are needed?," etc.) may include remediation, software version, and component information for the new hardware device. In an embodiment of the invention shown in FIG. 2C, the shared storage includes both the unstructured data (e.g., topic—install, topic—upgrade, etc.) and structured data (e.g., security fix, setup, etc.).

Figure 3:
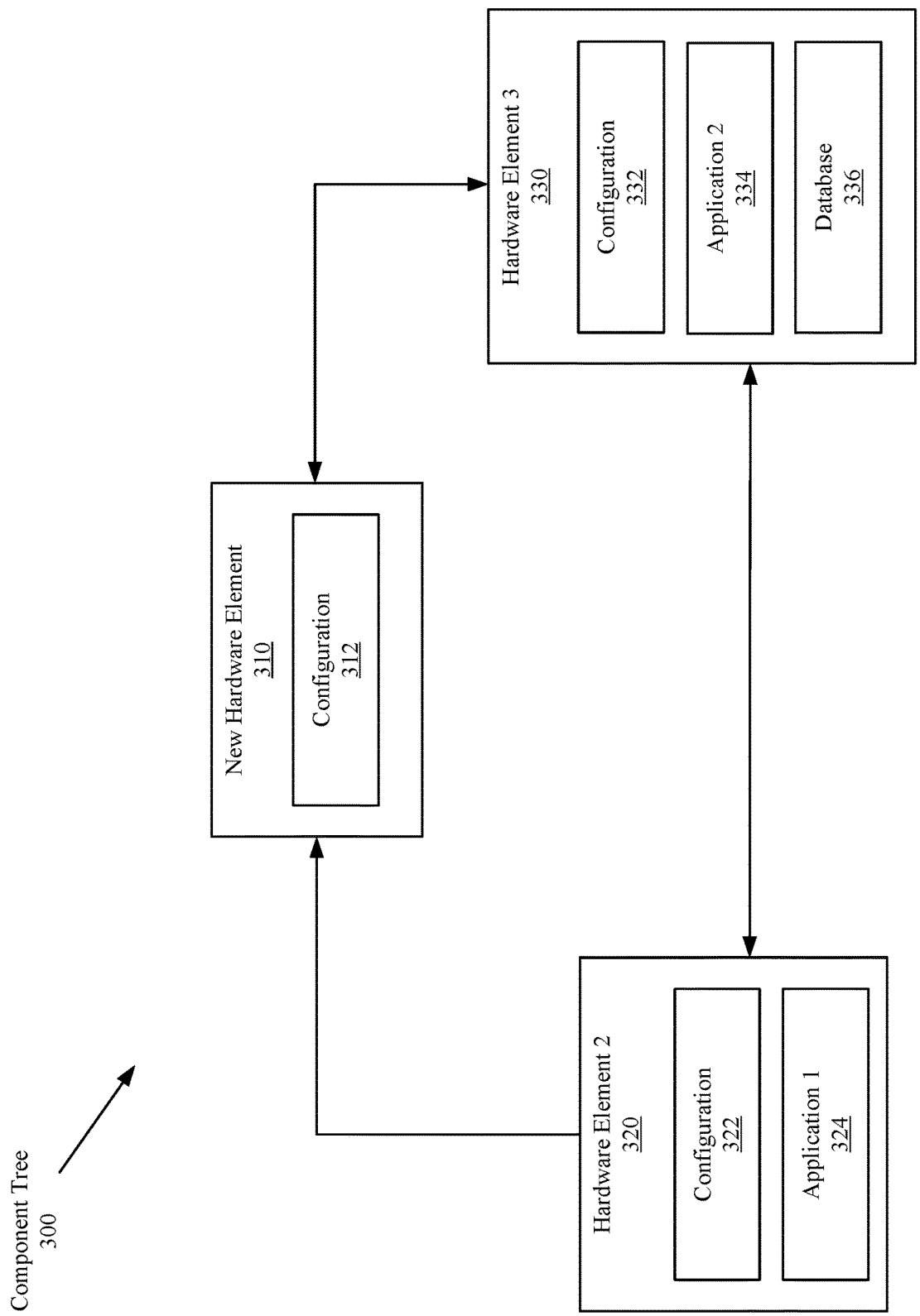
FIG. 3 shows a sample component tree in accordance with one or more embodiments of the invention.

FIG. 3 shows an exemplary component tree (300). In the component tree 300 shown in FIG. 3, a new hardware element (310) communicates and/or is associated with two other hardware elements 2 and 3 (320 and 330). While only two other hardware elements are shown in FIG. 3, the new hardware element may be related to more hardware elements depending on the specific configuration of the system (e.g., 100, FIG. 1A).

As will be described in more detail below with regards to the method shown in FIGS. 4 and 5, when a new hardware element (e.g., 310) is added to a system, a component tree (300) is prepared. From this component tree (300) the analyzer (e.g., 110, FIG. 1A) may determine how to configure the new hardware element (e.g., 310) as well as any dependent hardware elements (e.g., 320 and 330). Each of the hardware elements (e.g., 310, 320, and 330) must be configured to work with each other and they each have a configuration (312, 322, and 332). This configuration may be stored in the hardware element's own memory (such as but not limited to a flash-based ROM) or the configuration may be stored in a device's storage (e.g., 124, FIG. 1B) or as part of an operating system's configuration.

When the new hardware element (e.g., 310) is introduced, in the example shown in FIG. 3, it is determined that hardware element 2 (320) will need to use or communicated with the new hardware element (310) due to the hardware element 2 (320) hosting a first application 1 (324). Accordingly, both the configuration (312) of the new hardware element (310) and the configuration (322) of the hardware element 2 (320) will need to be reconfigured to allow for communication and proper functioning of application 1 (324).

Similarly, when the new hardware element (310) is introduced, it may be determined that hardware element 3 (330) communicates and/or has applications that the new hardware element (310) and hardware element 2 (320) are dependent on. In the example shown in FIG. 3, the hardware element 3 (330) includes a second application, application 2 (334) and a database (336). Since both the new hardware element (310) and hardware element 2 (320) both utilize or are used by the database (336) and application 2 (334), hardware element 3's (330) configuration (332) must also be modified to properly interact with the new hardware element (310).

In a non-limiting example, assume that the new hardware element (310) is a network interface card for communicating with the Internet. Application 1 (324) could be a web application that uses data stored in database (336). Since the introduction of the new network interface card determines how application 1 communicates with the Internet this may require both the configuration (322) for the hardware element 2 (320) and the configuration for the hardware element 3 (330) to be altered as will be described in more detail with regards to the methods shown in FIGS. 4 and 5. When the new hardware element in the form of a network interface card (NIC) is introduced the analyzer (e.g., 110, FIG. 1A) looks at such things as device criticality, network I/O load, model and workload of the NIC as well as the hardware elements 2 and 3 (e.g., 320 and 330). Based on the analyzation the analyzer performing the methods of FIGS. 4 and 5 described below may determine how to configure the NIC as well as hardware elements 2 and 3 (e.g., 320 and 330). Other combinations and types of hardware elements may be used besides those just described, and this is only a non-limiting example.

FIG. 4 shows a flowchart describing a method for detecting and configuring a new hardware element. The method may be performed, for example, by the analyzer and bare metal orchestrator (e.g., 110 and 130, FIG. 1A) and/or any other part of the system (e.g., 100, FIG. 1A) and computational devices (e.g., 120, FIG. 1A) shown in FIGS. 1A and 1B.

Other components of the system, including those illustrated in FIGS. 1A, 1B, and 2A-2C may perform all, or a portion of the method of FIG. 4 without departing from the invention. While FIG. 4 is illustrated as a series of steps, any of the steps may be omitted, performed in a different order, additional steps may be included, and/or any or all the steps may be performed in a parallel and/or partially overlapping manner without departing from the invention.

In step 400, system telemetry is monitored. The telemetry may be monitored continuously or periodically such as, but not limited to, every second, minute, hour, etc. The telemetry is monitored for the indication of a new or replacement hardware element. Alternatively in one or more embodiments of the invention, the OS or other hardware elements may signal that a new hardware element is present without the need for continuously or periodically monitoring system telemetry. When the new hardware element is detected either through telemetry or another source, in one or more embodiments the method continues automatically to step 410. Alternatively in one or more embodiments when the new hardware element is detected a user or administrator is notified, before the hardware element is automatically configured and/or the user or administrator may choose to instead perform a manual configuration.

The method detects the new hardware elements in step 410 and searches in the shared storage or in other locations for a pre-existing profile template that corresponds to the new hardware element. In one or more embodiments of the invention, the new hardware element may be identified based on a hardware ID that is provided by a manufacturer. This may include both a device ID and product ID. Other means of identifying the new hardware may be used without departing from the invention.

In step 420, if a profile template exists, then the method proceeds to step 460, otherwise the method proceeds to step 430. In step 430, a component tree for the new hardware element is prepared. The analyzer (e.g., 110, FIG. 1A), analyzes telemetry, logs, and other information to determined which other hardware elements and/or applications utilize or are utilized by the new hardware element. As shown in the example of FIG. 3, the various dependent components are mapped out and the mapping is saved to the shared storage. Once the component tree is prepared in step 430, the method proceeds to step 440 where a hardware profile template is prepared.

In one or more embodiment of the invention, in step 440 the analyzer (e.g., 110, FIG. 1A) utilizes one or more technical support systems TSS (e.g., 112A-112N, FIG. 1A) to prepare a hardware profile template. As described above, the TSS analyzes KB articles and other sources for each of the hardware elements in the component tree, to determine which hardware configurations (as well as software such as applications and databases) are needed to allow the new hardware element (and dependent hardware elements and applications) to function properly and efficiently. The method for preparing hardware profile template is described in more detail below in the method shown in FIG. 5.

Once the hardware profile template is determined in step 440, the profile is saved to the shared storage (e.g., 114, FIG. 1A). This allows the profile to be used if a similar hardware element/device is installed. For example, if the new hardware element detected in step 410 is a hard drive, and a second hard drive is installed immediately after the first hard drive, the profile may be reused. In one or more embodiments of the invention, the hardware profile template may be used by the TSS (e.g., 112A-112N, FIG. 1A) in step 440 to produce a hardware profile for a slightly different device (using the previous example if a second hard drive that is made by a different manufacturer is installed, the profile would be mostly the same and only require manufacturer specific changes to the hardware profile template for the second hard drive). While a hard drive is used as an example, the new hardware element could be any type of hardware device; such as a network interface card, processor, memory device, other storage device, etc., without departing from the invention.

Once the profile template is shared to storage in step 450, or the profile template is found in shared storage in step 420, the method proceeds to step 460. In step 460, the bare metal orchestrator (e.g., 130, FIG. 1A) uses the profile template to apply settings to the system. The bare metal orchestrator (e.g., 130, FIG. 1A) applies the recommended settings to each of the affected components (as determined by a component tree). The bare metal orchestrator may apply the setting remotely (such as when the bare metal orchestrator is located on a manufacture's datacenter and/or cloud environment, or the bare metal orchestrator may be local and even a part of the device (e.g., 120, FIG. 1A).

Once the bear metal orchestrator applies the settings to the system in step 460, the method of FIG. 4 may end.

FIG. 5 shows a flowchart describing a method for preparing a hardware profile template for a new hardware element in accordance go one of more embodiments of the invention. The method may be performed as step 440 of FIG. 4 or may be independent of the method shown in FIG. 4. The method may be performed, for example, by the analyzer and bare metal orchestrator (e.g., 110 and 130, FIG. 1A) and/or any other part of the system (e.g., 100, FIG. 1A) and computational devices (e.g., 120, FIG. 1A) shown in FIGS. 1A and 1B.

Other components of the system, including those illustrated in FIGS. 1A,1B, and 2A-2C may perform all, or a portion of the method of FIG. 5 without departing from the invention. While FIG. 4 is illustrated as a series of steps, any of the steps may be omitted, performed in a different order, additional steps may be included, and/or any or all the steps may be performed in a parallel and/or partially overlapping manner without departing from the invention.

In step 500, the new hardware as well as related hardware are identified. This may be done by utilizing the component tree such as the one prepared in step 430 of FIG. 4. Other methods of identifying the new hardware as well as related hardware may be used without departing from the invention. Once the new hardware and related hardware devices' IDs are determined, the method proceeds to step 510.

In step 510, device documents and configuration information from the manufacture and/or Internet for the new hardware element and related elements. The information in one or more embodiments of the invention may be in the form of KB articles and other documentation, such as but not limited to, that shown and discussed in FIG. 2C. The pertinent documentation is obtained, and in step 520 each document is aerated into structure and unstructured data.

Once the documentation is obtained and searched in steps 510 and 520, the method proceeds to step 530. In step 530 the structured and unstructured data is parsed, to determine the information that is useful in configuring the new hardware device and related hardware devices and applications. This parsed data is stored in the shared storage (e.g., 114, FIG. 1A) in step 540.

The parsed data stored in step 540 is searched using a context-aware search to determine the component factors for the new hardware element and related hardware element. In one or more embodiments of the invention the context-aware search is performed by using machine learning. Other methods of searching the parsed data may be used without departing from the invention. The result of the searching is then analyzed by the machine learning along with telemetry in step 560 to produce a profile template. The profile template indicates how each of the hardware elements and/or related applications should be configured to efficiently operate.

Once the profile template is made in step 560, the method of FIG. 5 may end.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612)

may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many diverse types of computing devices exist, and the aforementioned input and output device(s) may take other forms.

In general, embodiments described herein relate to methods, systems, and non-transitory computer readable mediums storing instructions for reconfiguring a system when a new hardware device/element is added to the system. In one or more embodiments of the invention proposes introducing an additional device or service: "bare metal orchestrator." The bare metal orchestrator, along with a system analyzer, determines dependencies and based on these dependencies and the system configuration determines an ideal configuration for the new hardware element as well as any other affected components of the computing system. This results in making installing a new hardware element more efficient, increasing productivity and system performance compared to previous methods that were often inefficient and even at times caused system or applications failures.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments may be devised which do not depart from the scope of embodiments as disclosed herein. Accordingly, the scope of embodiments described herein should be limited only by the attached claims.

What is claimed is:

1. A method for adjusting a datacenter when new hardware is added, the method comprising:
    retrieving telemetry from the datacenter;
    detecting, using the telemetry, one or more new hardware elements that have been added to the datacenter;
    identifying the one or more new hardware elements that have been added to the datacenter;
    determining that a hardware profile template for the identified one or more new hardware elements does not exist in a shared storage;
    creating a component tree for each of the identified one or more new hardware elements;
    using the component tree for each of the identified one or more new hardware elements, create a hardware profile template for each of the identified one or more new hardware elements;
    saving the hardware profile template for each of the identified one or more new hardware elements to the shared storage; and
    initiating application of, using the hardware profile template for each of the identified one or more new hardware elements in the shared storage, settings to configure the datacenter to use the one or more new hardware elements.

2. The method of claim 1, wherein initiating the application of settings to configure the datacenter to use the one or more new hardware elements is performed automatically.

3. The method of claim 1, wherein creating the hardware profile template for each of the identified one or more new hardware elements further comprises:
    retrieving configuration information and device documents for each of the identified one or more new hardware elements from an external source;
    parsing the retrieved configuration information and device documents into a searchable document;
    saving the searchable document into the shared storage;
    performing a context-aware search of the searchable document to determine component factors for each of the identified one or more new hardware elements; and
    analyzing the component factors using machine learning to produce the hardware profile template for each of the identified one or more new hardware elements.

4. The method of claim 3, wherein the machine learning uses reinforcement learning.

5. The method of claim 3, wherein the configuration information and device documents include knowledge base (KB) articles associated with the identified one or more new hardware elements.

6. The method of claim 1, wherein the initiating the application of settings to configure the datacenter to use the one or more new hardware elements is performed by a bare metal orchestrator.

7. The method of claim 1, wherein the initiating the application of settings to configure the datacenter to use the one or more new hardware elements comprises reconfiguring one or more other hardware elements in the datacenter.

8. The method of claim 1, wherein the initiating the application of settings to configure the datacenter to use the one or more new hardware elements comprises reconfiguring one or more applications hosted by the datacenter.

9. A non-transitory computer readable medium comprising computer readable program code, which when executed by a computer processor enables the computer processor to perform a method for adjusting a datacenter when new hardware is added, the method comprising:
    retrieving telemetry from the datacenter;
    detecting, using the telemetry, one or more new hardware elements that have been added to the datacenter;
    identifying the one or more new hardware elements that have been added to the datacenter;
    determining that a hardware profile template for the identified one or more new hardware elements does not exist in a shared storage;
    creating a component tree for each of the identified one or more new hardware elements;
    using the component tree for each of the identified one or more new hardware elements, create a hardware profile template for each of the identified one or more new hardware elements;
    saving the hardware profile template for each of the identified one or more new hardware elements to the shared storage; and
    initiating application of, using the hardware profile template for each of the identified one or more new hardware elements in the shared storage, settings to configure the datacenter to use the one or more new hardware elements.

10. The non-transitory computer readable medium of claim 9, wherein initiating the application of settings to configure the datacenter to use the one or more new hardware elements is performed automatically.

11. The non-transitory computer readable medium of claim 9, wherein creating the hardware profile template for each of the identified one or more new hardware elements further comprises:
    retrieving configuration information and device documents for each of the identified one or more new hardware elements from an external source;
    parsing the retrieved configuration information and device documents into a searchable document;
    saving the searchable document into the shared storage;
    performing a context-aware search of the searchable document to determine component factors for each of the identified one or more new hardware elements; and
    analyzing the component factors using machine learning to produce the hardware profile template for each of the identified one or more new hardware elements.

12. The non-transitory computer readable medium of claim 11, wherein the machine learning uses reinforcement learning.

13. The non-transitory computer readable medium of claim 11, wherein the configuration information and device documents include knowledge base (KB) articles associated with the identified one or more new hardware elements.

14. A system comprising:
    a datacenter which comprises:
        at least one processor; and
        at least one memory that includes instructions, which when executed by the processor, performs a method for adjusting the datacenter when new hardware is added, the method comprising:
            retrieving telemetry from the datacenter;
            detecting, using the telemetry, one or more new hardware elements that have been added to the datacenter;
            identifying the one or more new hardware elements that have been added to the datacenter;
            determining that a hardware profile template for the identified one or more new hardware elements does not exist in a shared storage;
            creating a component tree for each of the identified one or more new hardware elements;
            using the component tree for each of the identified one or more new hardware elements, create a hardware profile template for each of the identified one or more new hardware elements;
            saving the hardware profile template for each of the identified one or more new hardware elements to the shared storage; and
            initiating application of, using the hardware profile template for each of the identified one or more new hardware elements in the shared storage, settings to configure the datacenter to use the one or more new hardware elements.

15. The system of claim 14, wherein creating the hardware profile template for each of the identified one or more new hardware elements further comprises:
    retrieving configuration information and device documents for each of the identified one or more new hardware elements from an external source;
    parsing the retrieved configuration information and device documents into a searchable document;
    saving the searchable document into the shared storage;
    performing a context-aware search of the searchable document to determine component factors for each of the identified one or more new hardware elements; and
    analyzing the component factors using machine learning to produce the hardware profile template for each of the identified one or more new hardware elements.

16. The system of claim 15, wherein the machine learning uses reinforcement learning.

17. The system of claim 15, wherein the configuration information and device documents include knowledge base (KB) articles associated with the identified one or more new hardware elements.

18. The system of claim 14, wherein applying settings to configure the datacenter to use the one or more new hardware elements is performed by a bare metal orchestrator.

19. The system of claim 18, wherein the bare metal orchestrator is external to the datacenter.

20. The system of claim 18, wherein at least the bare metal orchestrator is part of a separate component of the datacenter not associated with the one or more new hardware elements.

* * * * *